US010438501B2

(12) United States Patent
Bruce et al.

(10) Patent No.: US 10,438,501 B2
(45) Date of Patent: *Oct. 8, 2019

(54) DYNAMIC ROLE-BASED INSTRUCTIONAL SYMBIONT FOR SOFTWARE APPLICATION INSTRUCTIONAL SUPPORT

(71) Applicant: International Business Machines Corporation, Armonk, NY (US)

(72) Inventors: Edwin J. Bruce, Corinth, TX (US); Tong C. Dougharty, Southlake, TX (US); Tassanee K. Supakkul, Euless, TX (US); Janki Y. Vora, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/250,437

(22) Filed: Aug. 29, 2016

(65) Prior Publication Data

US 2017/0011645 A1 Jan. 12, 2017

Related U.S. Application Data

(63) Continuation of application No. 12/940,461, filed on Nov. 5, 2010, now Pat. No. 9,449,524.

(51) Int. Cl.
*G09B 7/00* (2006.01)
*G09B 5/06* (2006.01)
(Continued)

(52) U.S. Cl.
CPC ............... *G09B 5/12* (2013.01); *G06F 9/453* (2018.02); *G09B 5/06* (2013.01); *G09B 7/00* (2013.01)

(58) Field of Classification Search
CPC ............... G09B 5/00; G09B 7/00; G09B 7/04
(Continued)

(56) References Cited

U.S. PATENT DOCUMENTS 5,535,422 A * 7/1996 Chiang .................. G06F 9/543
715/709
5,602,982 A * 2/1997 Judd .................. G09B 19/0053
715/709
(Continued)

OTHER PUBLICATIONS

U.S. Appl. No. 12/940,461, Non-Final Office Action, dated Apr. 10, 2013, 15 Pg.

(Continued)

*Primary Examiner* — Robert J Utama
(74) *Attorney, Agent, or Firm* — Cuenot, Forsythe & Kim, LLC (57) ABSTRACT

Instructional content is visually presented within a graphical user interface overlay on a display for an application window also presented on the display. Interactive events between a user and the application are dynamically detected. Responsive to the interactive events, state-specific substantive instructions are determined given a current state of the application as determined from the interactive events. The instructional content is dynamically modified to continuously present the state-specific substantive instructions that correspond with the detected interactive events. Presentation characteristics of a graphical user interface overlay are dynamically modified based on the interactive events to make the graphical user interface overlay unobtrusive to user-application interactions while ensuring the graphical user interface overlay is presented in a visually proximate position to a user's current interactive focus as determined from the interactive events, wherein unobtrusiveness of the graphical user interface overlay ensures that user inputs directed at the application are not interfered with.

20 Claims, 5 Drawing Sheets

(51) Int. Cl.
*G06F 9/451* (2018.01)
*G09B 5/12* (2006.01)

(58) Field of Classification Search
USPC .................................................. 434/323, 224
See application file for complete search history.

(56) References Cited

U.S. PATENT DOCUMENTS

| | | | | |
|---|---|---|---|---|
| 5,627,958 A * | 5/1997 | Potts | ................... | G06F 9/45512 |
| | | | | 434/118 |
| 5,754,176 A | 5/1998 | Crawford | | |
| 5,923,325 A * | 7/1999 | Barber | ................... | G06F 9/453 |
| | | | | 715/711 |
| 5,987,443 A * | 11/1999 | Nichols | ................... | G06Q 10/10 |
| | | | | 434/118 |
| 6,056,551 A * | 5/2000 | Marasco | ............... | G09B 17/003 |
| | | | | 434/178 |
| 6,067,084 A * | 5/2000 | Fado | ........................ | G06F 3/165 |
| | | | | 434/379 |
| 6,067,538 A * | 5/2000 | Zorba | ................... | G06Q 20/102 |
| | | | | 434/118 |
| 6,161,137 A * | 12/2000 | Ogdon | ................ | H04L 12/1813 |
| | | | | 348/E7.083 |
| 7,000,187 B2 | 2/2006 | Messinger et al. | | |
| 7,047,201 B2 * | 5/2006 | Chang | ..................... | G10L 19/00 |
| | | | | 704/221 |
| 7,620,895 B2 | 11/2009 | Adkins et al. | | |
| 7,640,548 B1 * | 12/2009 | Yu | ......................... | G06Q 10/10 |
| | | | | 705/7.26 |
| 2002/0118220 A1 | 8/2002 | Lui et al. | | |
| 2002/0168616 A1 * | 11/2002 | Chan | ....................... | G09B 7/02 |
| | | | | 434/118 |
| 2003/0222898 A1 | 12/2003 | Macomber et al. | | |
| 2005/0044500 A1 * | 2/2005 | Orimoto | ................ | G06F 3/0481 |
| | | | | 715/706 |
| 2006/0036965 A1 * | 2/2006 | Harris | ................... | G06F 3/0481 |
| | | | | 715/777 |
| 2007/0122789 A1 * | 5/2007 | Yoo | .......................... | G09B 7/00 |
| | | | | 434/323 |
| 2008/0229197 A1 | 9/2008 | Branson et al. | | |
| 2010/0088623 A1 * | 4/2010 | Ichino | ................... | G06F 3/0481 |
| | | | | 715/766 |
| 2010/0124736 A1 * | 5/2010 | Farid | ................... | G06Q 10/087 |
| | | | | 434/307 R |
| 2012/0115122 A1 | 5/2012 | Bruce et al. | | |

OTHER PUBLICATIONS

U.S. Appl. No. 12/940,461, Final Office Action, dated Oct. 1, 2013, 17 Pg.

U.S. Appl. No. 12/940,461, Non-Final Office Action, dated Nov. 17, 2014, 19 Pg.

U.S. Appl. No. 12/940,461, Final Office Action, dated Jun. 25, 2015, 20 Pg.

U.S. Appl. No. 12/940,461, Notice of Allowance, dated Jun. 6, 2016, 7 Pg.

* cited by examiner

DYNAMIC ROLE-BASED INSTRUCTIONAL SYMBIONT FOR SOFTWARE APPLICATION INSTRUCTIONAL SUPPORT

BACKGROUND

The present invention relates to the field of software application instructional support and, more particularly, to a dynamic role-based instructional symbiont for software application instructional support.

A wide variety of means have been created over the years to electronically support the instruction of users in regard to software applications. From computer-based training (CBT) courses and interactive tutorials to online help wizards and knowledge bases, users seeking additional training or instruction for using a software application have a multitude of options.

However, many of these conventional approaches for providing instructional support rely upon the user being able to choose the appropriate topic or operation for which they need assistance. Even when the correct topic is selected, the specific function or question that the user needs assistance with is overlooked or unsatisfactorily addressed. Such situations consume a great deal of the user's time as they locate and sit through unnecessary instructional sessions.

Most forms of instructional support, such as CBT courses, follow a linear progression of topics and/or tasks. That is, the instructional support mechanism provides the user with instructional data according to a predefined script. This is often frustrating for users who have some knowledge of the software application, since they must perform or acknowledge all topics/tasks that precede the specific topic/task of interest.

Thus, conventional instructional support models are only interactive in the sense that they require the user to perform some function (i.e., click a button or select a topic), either with the actual software application or a component of the instructional support application.

Additionally, conventional CBT courses have proven cumbersome and obtrusive to the user; in that they require him/her to constantly shift his/her attention between two or more different media, such as between a manual and a computer screen. Even computer-only instructional materials have suffered from "focus shifting" issues as users are often forced to divide their attention between two (or more) separate windows which operate independently of each other. For example, a user of an application receiving "help" from a help file for that application must shift his/her attention back and forth between the help file and the application itself.

SUMMARY

A method includes visually presenting instructional content within a graphical user interface overlay on a display for an application window also presented on the display, wherein application code controls behavior of the application window and instruction code presents the instructional content within the graphical user overlay, the application code and the instruction code being different runtime modules, each capable of operating independent of each other. The method also can include dynamically detecting interactive events between a user and the application. The method also can include, responsive to the interactive events, determining state-specific substantive instructions given a current state of the application as determined from the interactive events. The method also can include dynamically modifying the instructional content that is visually presented to continuously present the state-specific substantive instructions that correspond with the detected interactive events. The method also can include dynamically modifying, using a processor, presentation characteristics of a graphical user interface overlay based on the interactive events to make the graphical user interface overlay unobtrusive to user-application interactions while ensuring the graphical user interface overlay is presented in a visually proximate position to a user's current interactive focus as determined from the interactive events, wherein unobtrusiveness of the graphical user interface overlay ensures that user inputs directed at the application are not interfered with.

A system includes a processor programmed to initiate executable operations. The executable operations include visually presenting instructional content within a graphical user interface overlay on a display for an application window also presented on the display, wherein application code controls behavior of the application window and instruction code presents the instructional content within the graphical user overlay, the application code and the instruction code being different runtime modules, each capable of operating independent of each other. The executable operations also can include dynamically detecting interactive events between a user and the application. The executable operations also can include, responsive to the interactive events, determining state-specific substantive instructions given a current state of the application as determined from the interactive events. The executable operations also can include dynamically modifying the instructional content that is visually presented to continuously present the state-specific substantive instructions that correspond with the detected interactive events. The executable operations also can include dynamically modifying presentation characteristics of a graphical user interface overlay based on the interactive events to make the graphical user interface overlay unobtrusive to user-application interactions while ensuring the graphical user interface overlay is presented in a visually proximate position to a user's current interactive focus as determined from the interactive events, wherein unobtrusiveness of the graphical user interface overlay ensures that user inputs directed at the application are not interfered with.

A computer program product includes a computer readable storage medium having program code stored thereon, the program code executable by a processor to perform a method. The method can include visually presenting, by the processor, instructional content within a graphical user interface overlay on a display for an application window also presented on the display, wherein application code controls behavior of the application window and instruction code presents the instructional content within the graphical user overlay, the application code and the instruction code being different runtime modules, each capable of operating independent of each other. The method also can include dynamically detecting, by the processor, interactive events between a user and the application. The method also can include, responsive to the interactive events, determining, by the processor, state-specific substantive instructions given a current state of the application as determined from the interactive events. The method also can include dynamically modifying, by the processor, the instructional content that is visually presented to continuously present the state-specific substantive instructions that correspond with the detected interactive events. The method also can include dynamically modifying, by the processor, presentation characteristics of a graphical user interface overlay based on the interactive events to make the graphical user interface overlay unobtrusive to user-application interactions while ensuring the graphical user interface overlay is presented in a visually proximate position to a user's current interactive focus as determined from the interactive events, wherein unobtrusiveness of the graphical user interface overlay ensures that user inputs directed at the application are not interfered with.

DETAILED DESCRIPTION

In one embodiment of the disclosure, a "symbiont" can be used for delivering instructions upon a computing device, making the symbiont a component of a computer-based learning system. Just like "symbiosis" describes close and long-term interactions between different biological species, a symbiont in this context refers to a mechanism for delivering a close relationship between one or more applications and an instruction-providing system. As the term and the need for a mechanism per se imply, the application and the instructions (or instructional component) are each distinct entities. The symbiont is designed to deliver instruction content while minimally-intrusive to the applications it supports. In other words, in one embodiment, the symbiont is intended to have a mutualistic (e.g., mutually beneficial) or commensal (beneficial to one, and non-harmful to the other) relationship with an application for which it provides instructions. That is, the symbiont adds value to the application it supports while minimally obstructing interactions between the user and the application for which instructions are being provided. In one embodiment, the symbiont can vary in behavior, appearance, and content responsive to changes in an application state.

Stated differently, the disclosure describes a solution that dynamically provides instructional support in response to user interaction with one or more software applications. An instructional support symbiont can be used to capture events triggered by a user's interaction with a supported software application. Instructional responses for the events can be dynamically determined and run to provide the user with tailored data about application elements being interacted with. The instructional data can be displayed to the user in a presentation overlay within the graphical user interface (GUI) of the software application. Further, the appearance, behavior, transparency, and other characteristics of the symbiont's content delivery can vary to ensure that instructions are provided in a minimally-intrusive manner relative to the application being used. In one embodiment, these aspects of the symbiont can be customized by a user to suit their specific preferences. In another embodiment, the symbiont can leverage capabilities of a desktop manager or desktop environment to vary its presentation attributes in response to changes in application state. In one embodiment, the symbiont can support multiple different applications, which can include locally-executing, network-based, and/or Web-based applications—where behavior of the symbiont can vary based on the type of application being supported.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
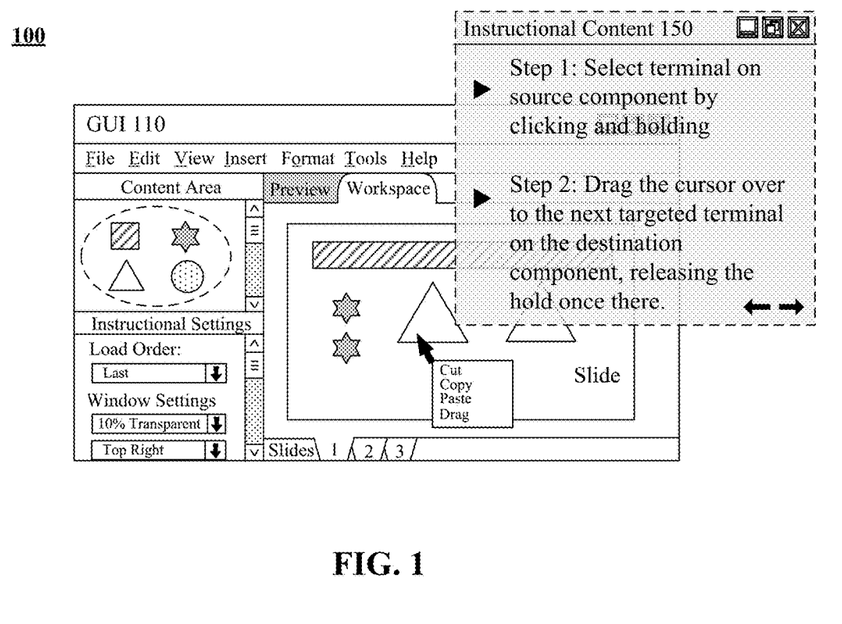
FIG. 1 is a depiction of a graphical user interface (GUI) desktop environment in accordance with an embodiment of the inventive arrangements disclosed herein.

FIG. 1 is a depiction of a graphical user interface (GUI) desktop environment 100 showing an instructional support symbiont in accordance with an embodiment of the inventive arrangements disclosed herein. The GUI 110 represents an application, which a user interacts with. The specific application shown is a drawing program, but any application program can be utilized.

Window 150 is a partially transparent pop-up window, which contains instructional content. The content of Window 150 is dynamically integrated with the state of the application of GUI 110. This state is expected to constantly change as the user interacts with GUI 110, which results in corresponding dynamic changes occurring within Window 150. For example, steps 1 and 2 as shown can guide or instruct a user in a proper manner to build a particular type of diagram. Should the user perform an action contrary to step 1, the content of Window 150 can change in a more focused manner, such as providing more rudimentary guidance on how to click on an object. In another example, if a user shows significant proficiency in following the steps, subsequent ones can be more tersely presented—so that a sophisticated user is presumed to know the basics of computing. Thus, content will be provided in Window 150 at a level of granularity appropriate for the proficiency level of the user. Proficiency can be gauged and implemented at different levels, such as basic computing proficiency, application-specific proficiency, subject matter proficiency, and the like.

In addition to the content of Window 150 being dynamically adjusted based on the interactive state of the application of GUI 110, presentation characteristics of Window 150 can vary as well. For example, Window 150 can move to be minimally intrusive to the actions being performed. In other words, instead of appearing in the top right corner of a desktop showing GUI 110, it can move to the bottom of the desktop whenever a user is interacting with the top right corner of the application. Hence, Window 150 can intentionally avoid blocking user actions. Additionally, the size, shape, transparency, font, shading, style, border width, and the like of Window 150 can be dynamically self-adjusted depending on application specifics.

In one embodiment, Window 150 itself can be implemented with code external to or independent of that used for GUI 110. That is, the backend code providing intelligence for Window 150, which is referred to as an instructional symbiont, can be independent of any particular application. This has the advantage of the instructional symbiont working across different applications. Further, customizations of the symbiont can be user-based, application-based, role-based, situation-based, and the like. Thus, the symbiont and the information presented within it become a general purpose tool to minimize the distance between applications and instructions in a minimally-intrusive, user friendly and customizable manner.

In one embodiment, Window 150 and the symbiont can be implemented as a tutorial, where multiple different applications can be integrated into that same tutorial. The tutorial itself can, optionally, be a real-time collaboration between a set of students and a proctor, where student performance is able to be represented to the proctor via the proctor's interface. For example, if a proctor was "losing" many of the students as indicated by the proctor's Window 150 of dynamic content, this situation could be brought to the proctor's attention so that dynamic adjustments could be made. In one embodiment, the instructional symbiont can be implemented as a supplier of or replacement for context-dependent help for applications. This content-dependent help could include online assistance from human experts in one embodiment. The symbiont could be implemented locally on a client, as a remote software service having context linkages, or as a hybrid of local and remotely run components.

Regardless of implementation specifics and configuration options selected, the goal of Window 150 and the symbiont is to minimize shifting between a primary application (of GUI 110) and instructional materials. That is, the instructional materials are to be provided in the same visual stream as that used for interacting with the application. In various embodiments, the instructional symbiont can incorporate code snippets and shortcuts as well as the firing of active links from within the instructional overlay (Window 150).

Features of Window 150 can vary from implementation to implementation. For example, the overlay Window 150 can include abilities for placement on the screen layout or page, on-demand resizing, and/or manipulation of stacking order (always higher than the primary application area, selectively higher, or always lower). In another example, instead of an instructional Window 150, "flyovers" can appear within the desktop that provide instructions as needed. Similarly, the symbiont and instructional content Window 150 can have the capability to control interface functions (move the cursor, type text, etc.) in the application to show the user how to interact with the interface in accordance with the instructions, as needed. In one contemplated embodiment, audio and/or video streams of instruction enhancement can be embedded and accommodated, and can be dynamically adjusted to suit a pace set by a user of GUI 110.

Figure 2:
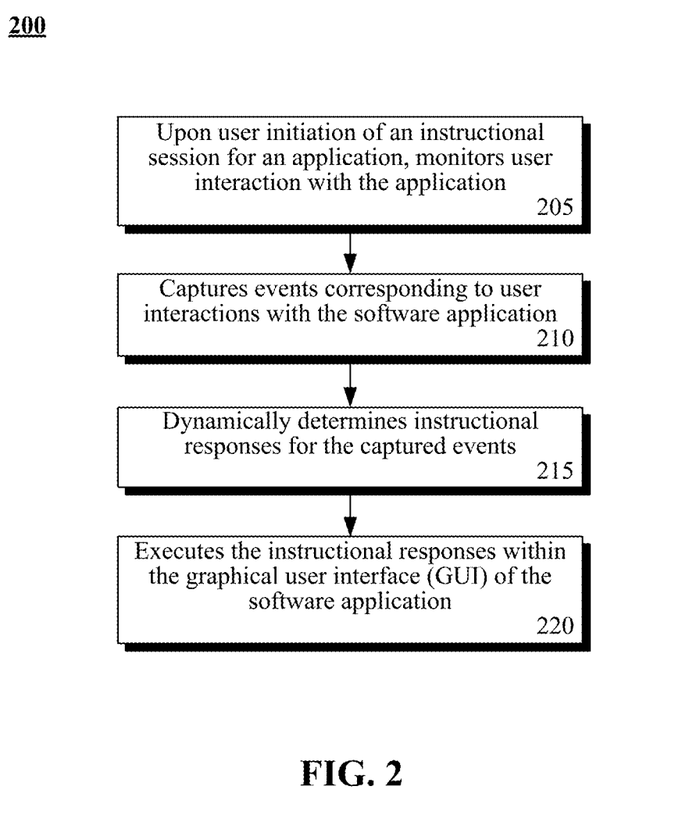
FIG. 2 is a flow chart of a method describing the general operation of an instructional support symbiont in accordance with embodiments of the inventive arrangements disclosed herein.

FIG. 2 is a flow chart of a method 200 describing the general operation of an instructional support symbiont in accordance with embodiments of the inventive arrangements disclosed herein.

Method 200 can begin in step 205 where the instructional support symbiont can monitor user interaction with a software application (or set of software applications in one embodiment) once an instructional session for that software application has been initiated. The instructional session can be initiated in a variety of ways, such as separate to the software application for which instructional support is being provided or via a mechanism (e.g., button, menu item, etc.) from within the software application itself.

Once both the instructional support symbiont and the software application that the instructional support symbiont is to provide instructional support for are active, the instructional support symbiont can capture events that correspond to user interactions with the software application in step 210. Step 210 can utilize various methods that are supported by the instructional support symbiont and client device upon which the instructional support symbiont is being run.

For example, the instructional support symbiont can utilize a listener component to receive event information from the software application, such as mouse clicks or mouse movements.

In step 215, instructional responses to the captured events can be dynamically determined. It is important to note that the instructional support provided by the instructional support symbiont is reactionary to the user's actions that generate the events captured in step 210. That is, the instructional support of the instructional support symbiont can be provided in an unscripted fashion; the symbiont can be dynamically tailored to how a user interacts with the underlying software application.

The instructional responses can then be run within the graphical user interface (GUI) of the software application in step 220. Again, specifics of step 220 can vary based upon the implementation of the instructional support symbiont and the support provided by the client device.

Figure 3:
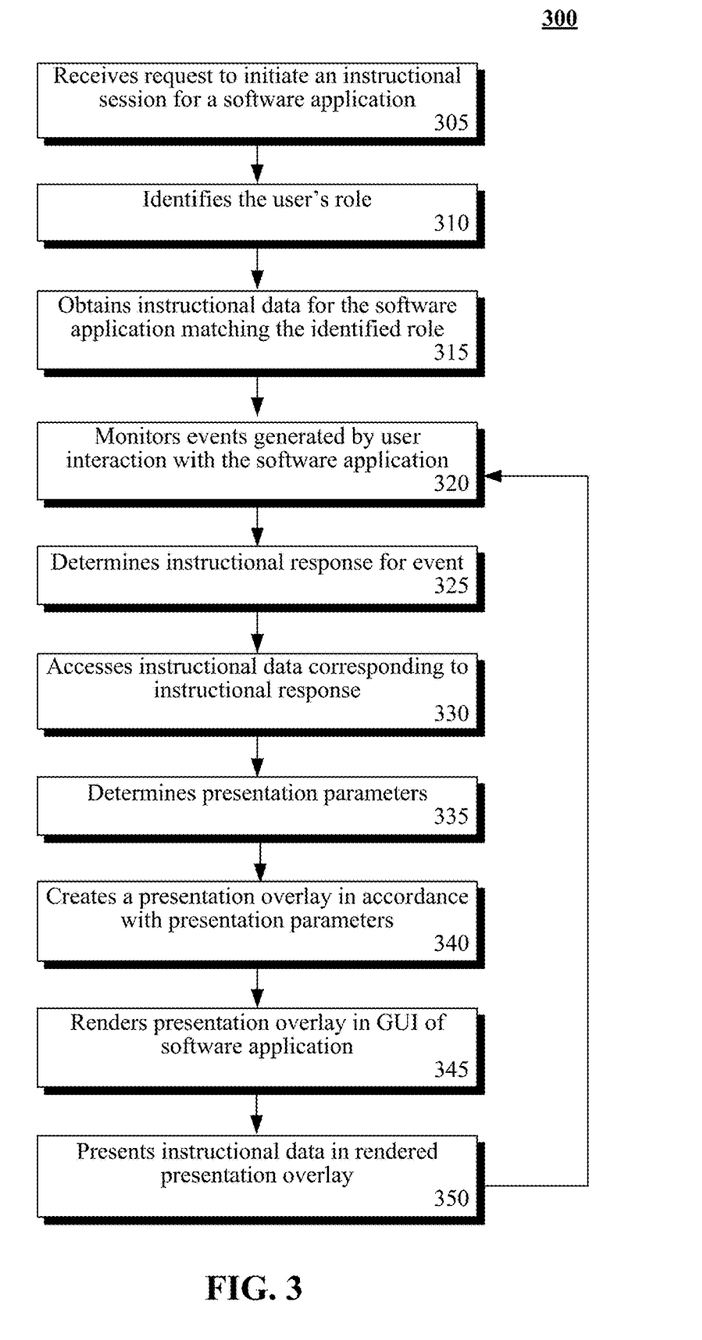
FIG. 3 is a flow chart of a method illustrating a more detailed operation of an embodiment of the instructional support symbiont tool in accordance with an embodiment of the inventive arrangements disclosed herein.

FIG. 3 is a flow chart of a method 300 illustrating a more detailed operation of an embodiment of the instructional support symbiont tool in accordance with embodiments of the inventive arrangements disclosed herein. Method 300 can represent a specific implementation of method 200.

Method 300 can begin in step 305 where the instructional support symbiont can receive a request to initiate an instructional session for a software application. Step 305 can be triggered via user selection of a launch mechanism separate to or in conjunction with the software application for which instructional support is being provided.

The user's role can be identified in step 310. The user's role can represent a parameter used by the instructional support symbiont to further refine the type of instructional support provided to the user, especially when the software application is designed to be used by various groups and/or levels of users.

For example, a floor clerk may only need to understand how to use an inventory software application to check the availability of merchandise, whereas a manager would need to know forecasting and reporting functions. Further, the role parameter can be expanded to include a proficiency level to indicate the depth of detail for the instructional support.

In step 315, instructional data that corresponds to the software application and user's role can be obtained. Depending upon the implementation of the instructional support symbiont, the obtained instructional data can be cached in a data store for quick access. The instructional support symbiont can then monitor the events generated by user interaction with the software application in step 320.

In step 325, an instructional response can be determined for a captured event. The instructional response can represent what actions the instructional support symbiont should perform for the captured event.

For example, an event indicating that the user has selected a menu command can result in an instructional response determining that the instructional support symbiont should present the user with instructional data for that menu command.

The instructional data corresponding to the instructional response can be accessed in step 330. In step 335, presentation parameters for the instructional response can be determined. The presentation parameters can correspond to a variety of values that represent how the instructional data is to be presented to the user.

Examples of presentation parameters can include, but are not limited to, coordinates defining where the instructional data is to be presented, an auxiliary software application required for presenting the instructional data, window size, window opacity, font size, font type, font hue, how the instructional data is to be presented (i.e., audio, video, textual), and the like. The presentation parameters can also include values that are user-configurable, such as those parameters relating to text.

A presentation overlay can be created in step 340 that conforms to the determined presentation parameters. The presentation overlay can represent an area of a specified size that can be presented or overlaid upon another area, possibly as a pop-up window.

In step 345, the presentation overlay can be rendered within the graphical user interface (GUI) of the software application. The instructional data can then be presented to the user in the rendered presentation overlay in step 350.

Figure 4:
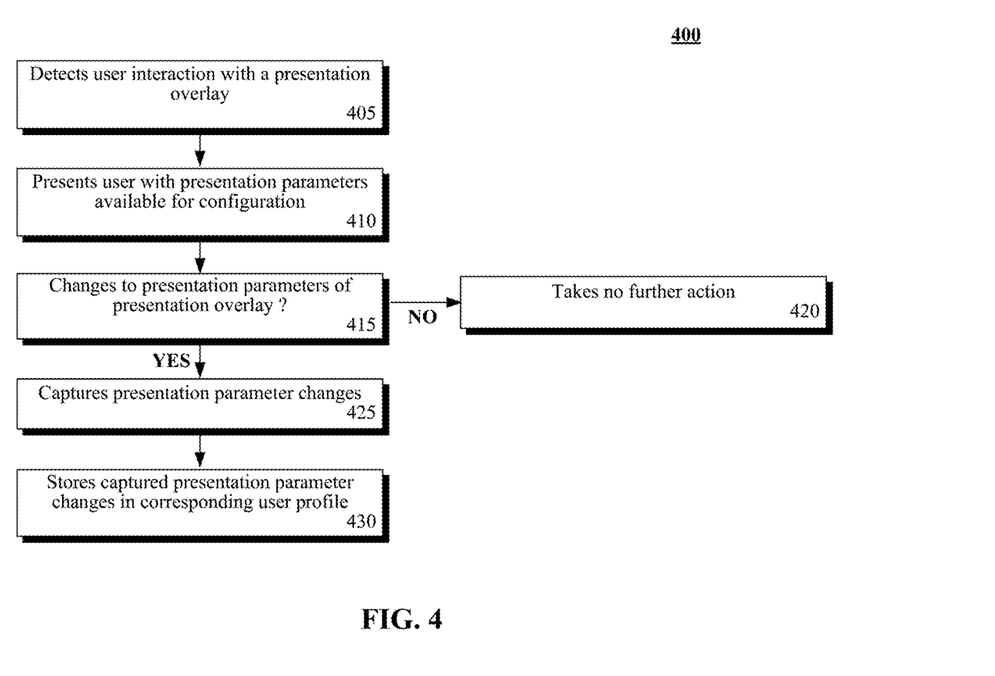
FIG. 4 is a flow chart of a method describing user configuration of presentation parameters to be used by the instructional support symbiont in accordance with an embodiment of the inventive arrangements disclosed herein.

FIG. 4 is a flow chart of a method 400 describing user configuration of presentation parameters to be used by the instructional support symbiont in accordance with embodiments of the inventive arrangements disclosed herein. Method 400 can be performed in conjunction with methods 200 and/or 300.

Method 400 can begin in step 405 where the instructional support symbiont can detect user interaction with a presentation overlay (i.e., the user selects the window, the user accesses a menu associated with the presentation overlay). The user can be presented with the presentation parameters that are available for configuration in step 410.

In step 415, it can be determined if changes have been made to the presentation parameters of the presentation overlay. When changes have not been made, step 420 can execute where no further action is taken by the instructional support symbiont.

When changes have been made, the changes to the presentation parameters can be captured in step 425. In step 430, the captured presentation parameter changes can be stored in a corresponding user profile.

Figure 5A:
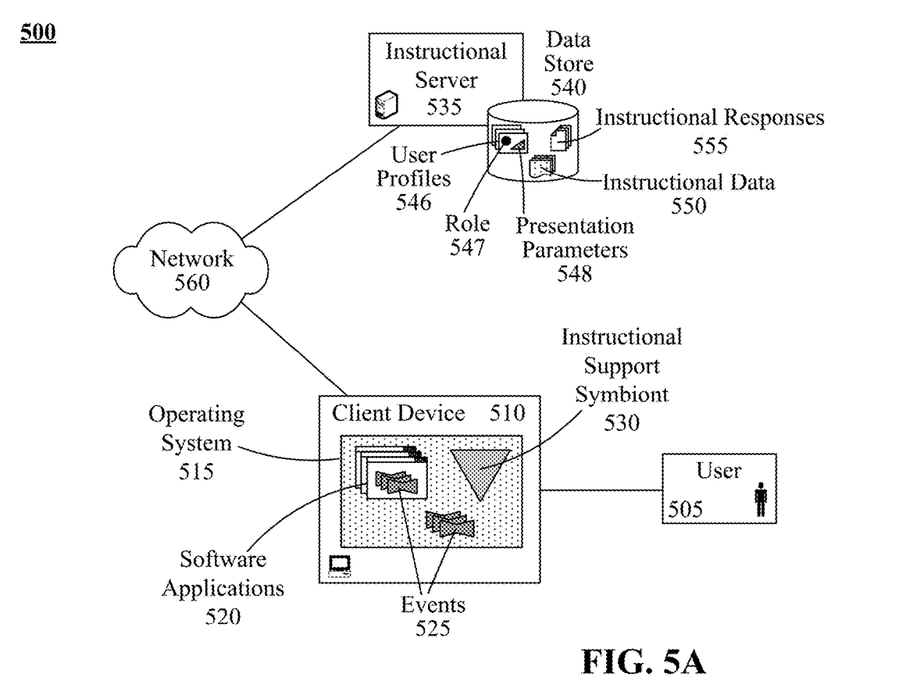
FIG. 5A is a schematic diagram illustrating a system that utilizes the instructional support symbiont in accordance with embodiments of the inventive arrangements disclosed herein.

FIG. 5A is a schematic diagram illustrating a system 500 that utilizes the instructional support symbiont 530 in accordance with embodiments of the inventive arrangements disclosed herein. System 500 can be configured to perform the steps described in methods 200, 300, and/or 400.

In system 500, the instructional support symbiont 530 can communicate with an instructional server 535 over a network 560 to present the user 505 with instructional data 550 for a specific software application 520 running on the client device 510. The client device 510 can represent a variety of computing devices capable of supporting the functions of various software applications 520 and the instructional support symbiont 530 as well as network 560 communication.

Client device 510 can be configured to run an operating system 515 for handling basic hardware/software communications when executing the software code of the software applications 520 and/or instructional support symbiont 530. Operating system 515 can be configured to support a windowed user interface environment (e.g., MICROSOFT WINDOWS, XWINDOWS).

Figure 5B:
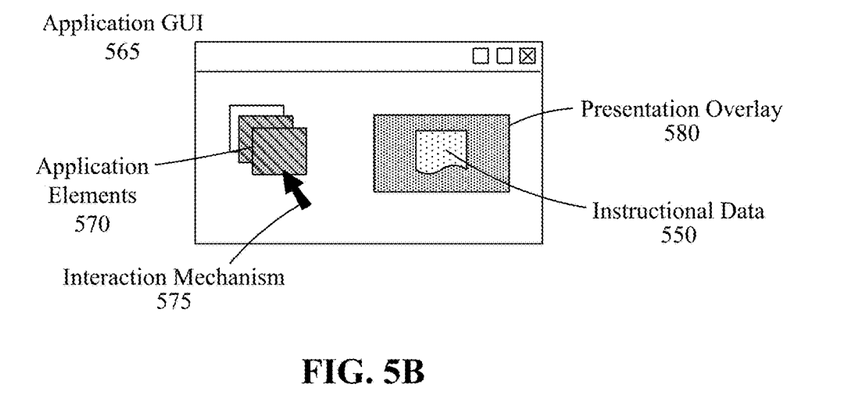
FIG. 5B is a schematic diagram illustrating a system that utilizes a presentation overlay for the presentation of instructional data in accordance with embodiments of the inventive arrangements disclosed herein.

The software applications 520 can represent a variety of computer programs installed or capable of presenting a graphical user interface (GUI), such as the application GUI 565 shown in FIG. 5B, for the processing and/or presentation of application elements 570. Application elements 570 can represent the variety of components (e.g., windows, menus, graphics, text, etc.) presented to the user 505 within the application GUI 565 by the software application 520.

Typically, the user 505 can interact with the application elements 570 using an interaction mechanism 575 supported by the client device 510 and software application 520. The interaction mechanism 575 can be graphically presented in the application GUI 565 and the actions which the user 505 performs with it can be coupled with one or more peripheral devices like a keyboard and/or mouse.

When the user 505 performs an action upon an application element 570 with the interaction mechanism 575, one or more events 525 can be generated by the software application 520 and/or operating system 515, depending on the operations being run. An event 525 can represent an action triggered by the user's 505 interaction with the software application 520 via the interaction mechanism 575 (i.e., mouse clicks, keyboard strokes, hover location, focus on element 570, change focus, etc.).

The instructional support symbiont 530 can represent a software application configured to intercept events 525 and provide instructional support to the user 505. As used herein, the term "instructional support" refers to predefined information designed to provide assistance with the user's 505 utilization and/or proficiency with a software application 520.

From the captured events 525, the instructional support symbiont 530 can determine one or more instructional responses 555 for processing. An instructional response 555 can represent a set of programmatic instructions for processing by the instructional support symbiont 530. The instructional support symbiont 530 can be configured to utilize various operating conditions when determining the instructional responses 555 for a captured event 525. As previously discussed, these operating conditions can include a role 547 associated with the user 505 as well as the specific software application 520 for which instructional support is being provided.

For example, the instructional response 555 when the mouse pointer 575 is positioned (i.e., hovered) over the report button 570 of an inventory management application 520 can be to display a "Not required for your role" message for users 505 whose role 547 is "Clerk", as opposed to an explanation of use for users 505 having a role 547 of "Manager".

An instructional response 555 can include the presentation of instructional data 550 to the user 505. Instructional data 550 can represent an element of instructional support meant to provide knowledge and/or guidance for the application element 570 being interacted with by the user 505. Using the previous example, instructional data 550 can correspond to the explanation of use provided to users 505 having the role 547 of "Manager".

The instructional data 550 can encompass a variety of data types and can require the use of additional software applications 520 for presentation. For example, when the instructional data 550 is a video file, an appropriate video player 520 can be invoked upon the client device 510 to play the video file.

The presentation of the instructional data 550 to the user 505 can utilize a presentation overlay 580, as shown in FIG. 5B. The presentation overlay 580 can represent a predefined area like a window that is rendered upon and within the application GUI 565. The predefined area of the presentation overlay 580 can be controlled by one or more presentation parameters 548.

Additionally, the presentation parameters 548 can include variables and values that affect how the instructional data 550 is displayed within the presentation overlay 580. The variables contained in the presentation parameters 548 can have values that are set by default as well as user-configurable values. For example, a user 505 can change the size and hue of textual instructional data 550, but cannot change the instructional data 550 path.

User-configured presentation parameters 548 can be stored as part of a user profile 546 associated with the user 505. The user profile 546 can also contain the user's 505 role 547.

The instructional responses 555, instructional data 550, and/or user profiles 546 can be housed in a data store 540 of an instructional server 535. The instructional server 535 can represent the hardware and/or software components required to communicate over the network 560 with the client device 510 and manage access to data store 540.

In another embodiment, the instructional support symbiont 530 can run from the instructional server 535, interacting with the software application 520 and/or operating system 515 of the client device 510 over the network 560. In such an embodiment, the instructional support symbiont 530 can be a service provided by the instructional server 535.

In yet another embodiment, the user profile 546 can reside in a data store (not shown) local to the client device 510.

As used herein, presented data store 540 can be a physical or virtual storage space configured to store digital information. Data store 540 can be physically implemented within any type of hardware including, but not limited to, a magnetic disk, an optical disk, a semiconductor memory, a digitally encoded plastic memory, a holographic memory, or any other recording medium. Data store 540 can be a stand-alone storage unit as well as a storage unit formed from a plurality of physical devices. Additionally, information can be stored within data store 540 in a variety of manners. For example, information can be stored within a database structure or can be stored within one or more files of a file storage system, where each file may or may not be indexed for information searching purposes. Further, data store 540 can utilize one or more encryption mechanisms to protect stored information from unauthorized access.

Network 560 can include any hardware/software/firmware necessary to convey data encoded within carrier waves. Data can be contained within analog or digital signals and conveyed though data or voice channels. Network 560 can include local components and data pathways necessary for communications to be exchanged among computing device components and between integrated device components and peripheral devices. Network 560 can also include network equipment, such as routers, data lines, hubs, and intermediary servers which together form a data network, such as the Internet. Network 560 can also include circuit-based communication components and mobile communication components, such as telephony switches, modems, cellular communication towers, and the like. Network 560 can include line based and/or wireless communication pathways.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be run substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
visually presenting instructional content within a graphical user interface overlay on a display for an application window, of an application, also presented on the display, wherein application code controls behavior of the application window and instruction code presents the instructional content within the graphical user interface overlay, the application code and the instruction code being different runtime modules, each capable of operating independent of each other;
dynamically detecting interactive events between a user and the application;
responsive to the interactive events, determining state-specific substantive instructions given a current state of the application as determined from the interactive events, wherein the instructional content are predefined information to guide a user in utilizing the application based on current state of the application;
dynamically modifying the instructional content that is visually presented to continuously present the state-specific substantive instructions that correspond with the detected interactive events; and
dynamically modifying, using a processor, presentation characteristics of the graphical user interface overlay based on the interactive events in a manner to enable the user to interact with the application by avoiding blocking user actions at a current interactive focus of the user as determined from the interactive events by varying the presentation characteristics of the graphical user interface overlay, the varying the presentation characteristics of the graphical user interface overlay comprising moving the graphical user interface overlay to a location away from the user's current interactive focus, wherein unobtrusiveness of the graphical user interface overlay ensures that user inputs directed at the application are not interfered with, wherein the varying the presentation characteristics of the graphical user interface overlay repeats responsive to detecting a change in the user's current interactive focus.

2. The method of claim 1, wherein the state-specific substantive instructions are also role-specific based on a functional role of a user so that users having different roles are presented with different state-specific substantive instructions given equivalent detected interactive events.

3. The method of claim 1, wherein the state-specific substantive instructions are customized based on a user-specific proficiency level with computing devices, as automatically determined from the detected interactive events.

4. The method of claim 1, wherein the state-specific substantive instructions are customized based on a user-domain proficiency level with substantive content presented within the application window, as automatically determined from the detected interactive events.

5. The method of claim 1, wherein the instructional content presented in the graphical user interface overlay is a tutorial, which involves an interactive use of the application, the tutorial comprising a plurality of waypoints, each associated with tutorial state, the method further comprising:
continuously mapping the waypoints of the tutorial state to application states as determined from the interactive events; and
dynamically modifying substantive content within the graphical user interface overlay in a waypoint-dependent manner based upon the mapping of the tutorial state to the application states.

6. The method of claim 1, wherein the instructional content that is presented comprises at least one of audio content and video content, the method further comprising:
dynamically adjusting a playback rate of the audio content or video content responsive to the detected interactive events to match a pace of the playback and the detected interactive events.

7. The method of claim 1, further comprising:
dynamically determining user compliance with discrete stages of a tutorial responsive to the user-application interactions; and
updating instructional content provided in the graphical user interface overlay per specific stages of the tutorial, wherein the instructional content provided in the presentation overlay is adjusted for a proficiency level of a user, as dynamically determined from the user-application interactions.

8. A system, comprising:
a processor programmed to initiate executable operations comprising
visually presenting instructional content within a graphical user interface overlay on a display for an application window, of an application, also presented on the display, wherein application code controls behavior of the application window and instruction code presents the instructional content within the graphical user interface overlay, the application code and the instruction code being different runtime modules, each capable of operating independent of each other;

dynamically detecting interactive events between a user and the application;
responsive to the interactive events, determining state-specific substantive instructions given a current state of the application as determined from the interactive events, wherein the instructional content are predefined information to guide a user in utilizing the application based on current state of the application;
dynamically modifying the instructional content that is visually presented to continuously present the state-specific substantive instructions that correspond with the detected interactive events; and
dynamically modifying presentation characteristics of the graphical user interface overlay based on the interactive events in a manner to enable the user to interact with the application by avoiding blocking user actions at a current interactive focus of the user as determined from the interactive events by varying the presentation characteristics of the graphical user interface overlay, the varying the presentation characteristics of the graphical user interface overlay comprising moving the graphical user interface overlay to a location away from the user's current interactive focus, wherein unobtrusiveness of the graphical user interface overlay ensures that user inputs directed at the application are not interfered with, wherein the varying the presentation characteristics of the graphical user interface overlay repeats responsive to detecting a change in the user's current interactive focus.

9. The system of claim 8, wherein the state-specific substantive instructions are also role-specific based on a functional role of a user so that users having different roles are presented with different state-specific substantive instructions given equivalent detected interactive events.

10. The system of claim 8, wherein the state-specific substantive instructions are customized based on a user-specific proficiency level with computing devices, as automatically determined from the detected interactive events.

11. The system of claim 8, wherein the state-specific substantive instructions are customized based on a user-domain proficiency level with substantive content presented within the application window, as automatically determined from the detected interactive events.

12. The system of claim 8, wherein the instructional content presented in the graphical user interface overlay is a tutorial, which involves an interactive use of the application, the tutorial comprising a plurality of waypoints, each associated with tutorial state, the executable operations further comprising:
continuously mapping the waypoints of the tutorial state to application states as determined from the interactive events; and
dynamically modifying substantive content within the graphical user interface overlay in a waypoint-dependent manner based upon the mapping of the tutorial state to the application states.

13. The system of claim 8, wherein the instructional content that is presented comprises at least one of audio content and video content, the executable operations further comprising:
dynamically adjusting a playback rate of the audio content or video content responsive to the detected interactive events to match a pace of the playback and the detected interactive events.

14. The system of claim 8, the executable operations further comprising:

dynamically determining user compliance with discrete stages of a tutorial responsive to the user-application interactions; and
updating instructional content provided in the graphical user interface overlay per specific stages of the tutorial, wherein the instructional content provided in the presentation overlay is adjusted for a proficiency level of a user, as dynamically determined from the user-application interactions.

15. A computer program product comprising a computer readable storage medium having program code stored thereon, wherein the computer readable storage medium is not a transitory, propagating signal per se, the program code executable by a processor to perform a method comprising:
visually presenting, by the processor, instructional content within a graphical user interface overlay on a display for an application window, of an application, also presented on the display, wherein application code controls behavior of the application window and instruction code presents the instructional content within the graphical user interface overlay, the application code and the instruction code being different runtime modules, each capable of operating independent of each other;
dynamically detecting, by the processor, interactive events between a user and the application;
responsive to the interactive events, determining, by the processor, state-specific substantive instructions given a current state of the application as determined from the interactive events, wherein the instructional content are predefined information to guide a user in utilizing the application based on current state of the application;
dynamically modifying, by the processor, the instructional content that is visually presented to continuously present the state-specific substantive instructions that correspond with the detected interactive events; and
dynamically modifying, by the processor, presentation characteristics of the graphical user interface overlay based on the interactive events in a manner to enable the user to interact with the application by avoiding blocking user actions at a current interactive focus of the user as determined from the interactive events by varying the presentation characteristics of the graphical user interface overlay, the varying the presentation characteristics of the graphical user interface overlay comprising moving the graphical user interface overlay to a location away from the user's current interactive focus, wherein unobtrusiveness of the graphical user interface overlay ensures that user inputs directed at the application are not interfered with, wherein the varying the presentation characteristics of the graphical user interface overlay repeats responsive to detecting a change in the user's current interactive focus.

16. The computer program product of claim 15, wherein the state-specific substantive instructions are also role-specific based on a functional role of a user so that users having different roles are presented with different state-specific substantive instructions given equivalent detected interactive events.

17. The computer program product of claim 15, wherein the state-specific substantive instructions are customized based on a user-specific proficiency level with computing devices, as automatically determined from the detected interactive events.

18. The computer program product of claim 15, wherein the state-specific substantive instructions are customized based on a user-domain proficiency level with substantive content presented within the application window, as automatically determined from the detected interactive events.

19. The computer program product of claim 15, wherein the instructional content presented in the graphical user interface overlay is a tutorial, which involves an interactive use of the application, the tutorial comprising a plurality of waypoints, each associated with tutorial state, the method further comprising:
   continuously mapping the waypoints of the tutorial state to application states as determined from the interactive events; and
   dynamically modifying substantive content within the graphical user interface overlay in a waypoint-dependent manner based upon the mapping of the tutorial state to the application states.

20. The computer program product of claim 15, wherein the instructional content that is presented comprises at least one of audio content and video content, the method further comprising:
   dynamically adjusting a playback rate of the audio content or video content responsive to the detected interactive events to match a pace of the playback and the detected interactive events.

* * * * *